United States Patent [19]
Bogunovich et al.

[11] 3,843,174
[45] Oct. 22, 1974

[54] ANTI-THEFT DOOR-LOCKING APPARATUS

[75] Inventors: Ronald A. Bogunovich, San Lorenzo; Joseph V. Bogunovich, San Leandro, both of Calif.

[73] Assignee: Henrietta A. Bogunovich, San Leandro, Calif. ; by said Joseph V. Bogunovich

[22] Filed: Dec. 29, 1972

[21] Appl. No.: 319,377

[52] U.S. Cl.................... 292/166, 292/144, 292/333
[51] Int. Cl.............................................. E05b 65/16
[58] Field of Search ...... 70/275, 282; 292/144, 166, 292/300, 302, 303, 304, 332, 333, 334, 335

[56] References Cited
UNITED STATES PATENTS

| | | | |
|---|---|---|---|
| 86,792 | 2/1869 | Wilson | 292/166 |
| 1,797,384 | 3/1931 | Ward et al. | 70/282 |
| 1,816,134 | 7/1931 | Wood | 292/333 |
| 2,570,390 | 10/1951 | Schuldt | 292/335 |
| 2,734,764 | 2/1956 | Angelo | 292/333 |
| 3,601,453 | 8/1971 | Silverman | 303/89 |
| 3,624,761 | 11/1971 | Kohn | 180/112 |

*Primary Examiner*—Albert G. Craig, Jr.
*Attorney, Agent, or Firm*—Joseph B. Gardner, Esq.

[57] ABSTRACT

Anti-theft door-locking apparatus for use with semi-trailers, delivery vans, railway cars, and similar freight-storage and transport vehicles to prevent pilferage from the freight compartments thereof. The apparatus includes a reciprocal locking pin selectively movable between an active position in cooperative engagement with the access door of a freight compartment to constrain the door in the closed position thereof and an inactive position releasing such door for movement. The locking pin is controlled by plunger means movable between operative and inoperative positions respectively corresponding to the active and inactive positions of the locking pin and connected therewith so as to control the position thereof. The plunger means are biased toward the operative position thereof by spring structure which therefore tends to maintain the locking pin in its active position, and selectively operative energizing means which may be mechanical in nature or pneumatic, depending upon the embodiment of the invention, are effective to displace the plunger means against the biasing force of such spring and thereby displace the locking pin into its inactive position. Special equipment such as a source of compressed air provided by the tractor of a tractor-semitrailer rig or a forklift truck capable of providing a pulling force of substantial magnitude is required to supply the energizing means required to displace the locking pin into its inactive position. However, such special equipment is generally available to authorized personnel but not to those who might pilfer freight. The apparatus also includes operation-inhibiting means in the form of an abutment component or a detent and recess arrangement to hold the locking pin in its inactive position once it has been appropriately displaced thereinto so as to prevent inadvertent or unauthorized return movement of the locking pin into the active position thereof.

8 Claims, 13 Drawing Figures

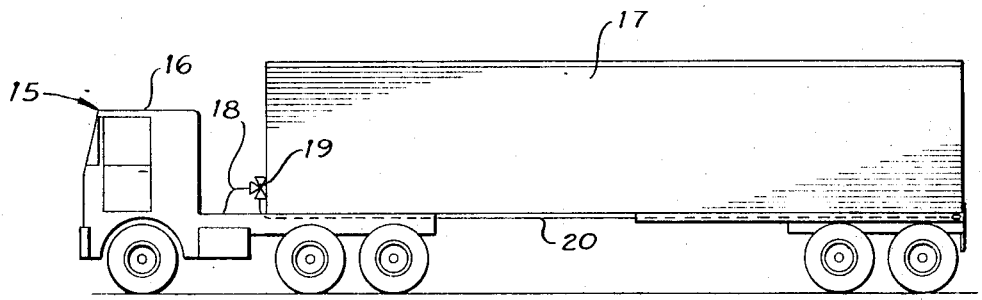
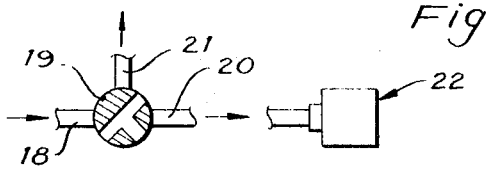
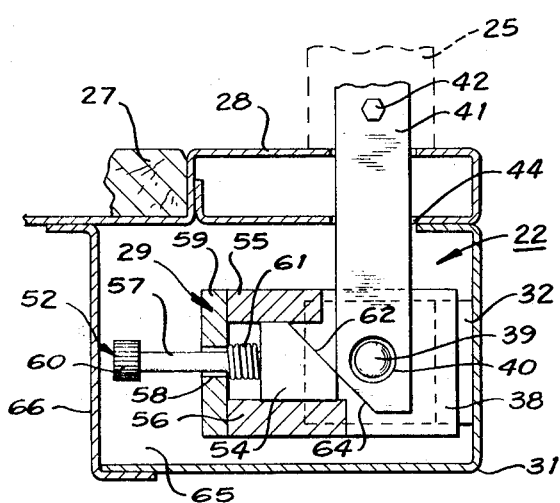
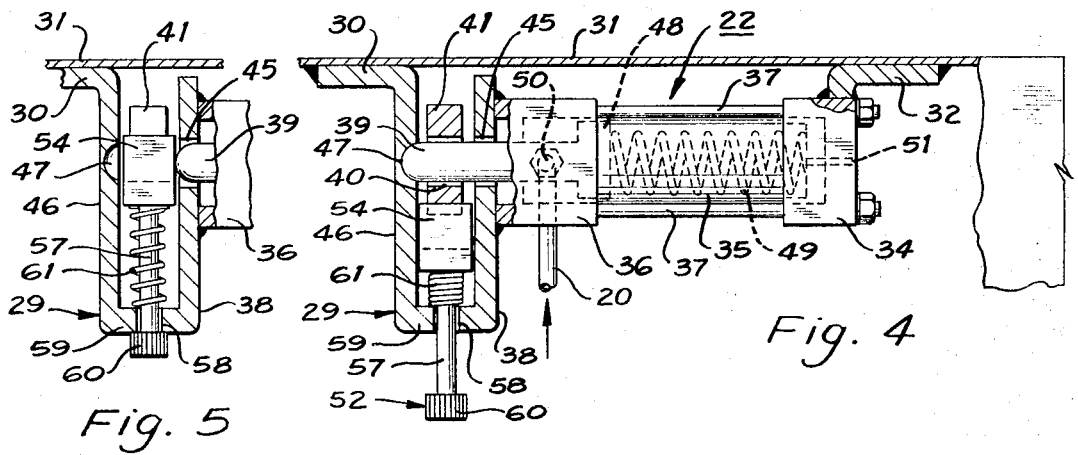

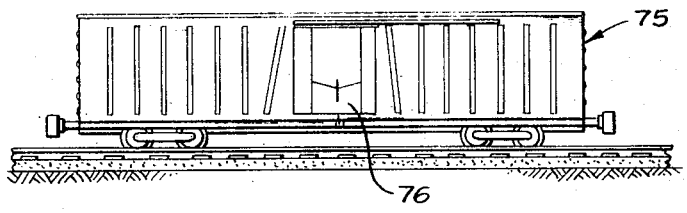
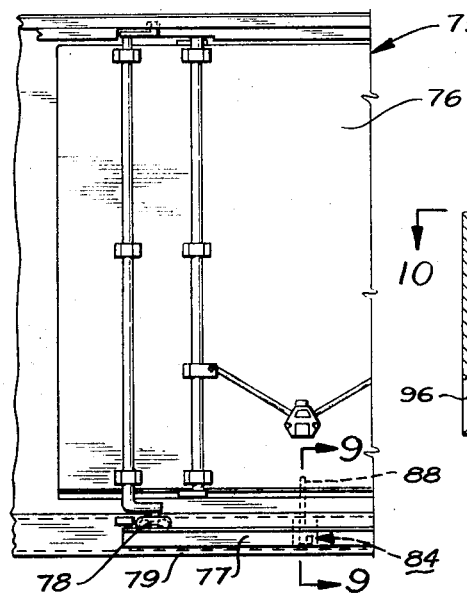
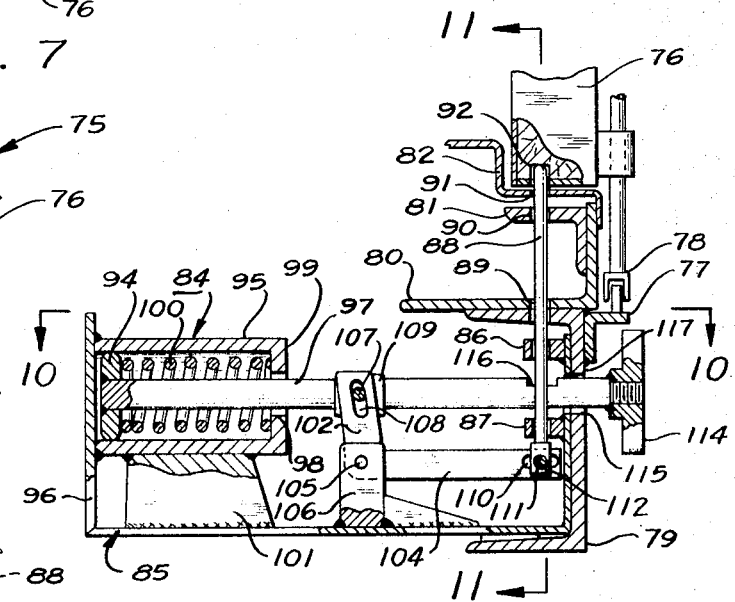
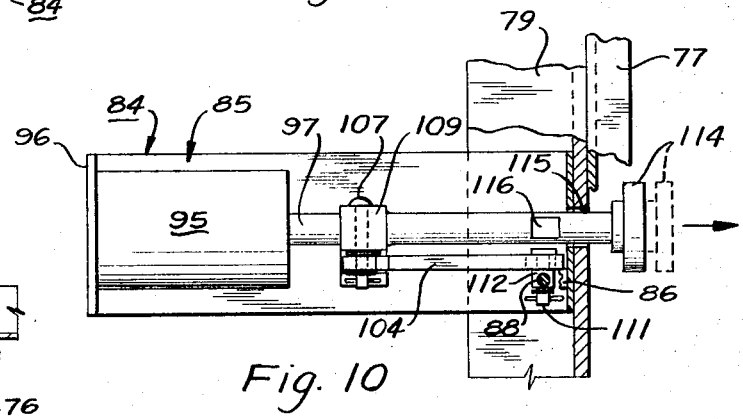
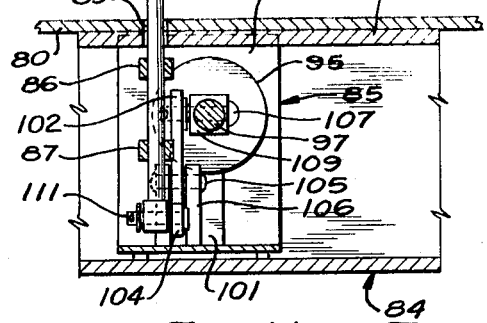
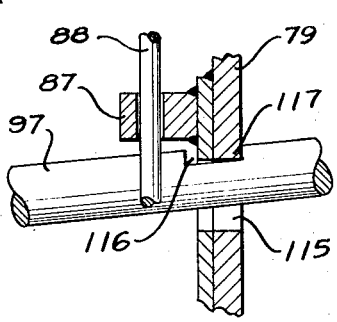
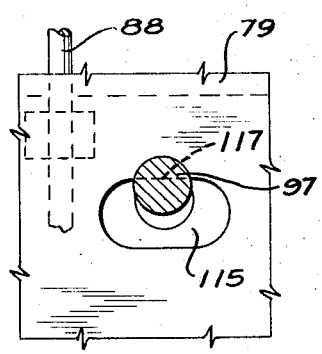

ANTI-THEFT DOOR-LOCKING APPARATUS

This invention relates to door-locking apparatus and, more particularly, to anti-theft door-locking apparatus for use with freight-storage and freight-transport vehicles and containers to prevent unauthorized access into the freight compartments thereof through access doors therefor. Specific examples of environmental uses for the invention include automotive vehicles such as tractor-trailer rigs, delivery vans, military vans, railway cars, sea van and intermodal containers, and the like.

Pilferage of freight from vehicles and containers used by the transportation industry has reached staggering monetary proportions and continues to increase at an everaccelerating rate. By way of example, the June 19, 1972 issue of Traffic World states that the loss and damage tabulation for 1971 by the 79 member carriers of the Association of American Railroads ". . . showed that theft accounted for a total of $10,240,114.00;". The loss by theft from automotive vehicles used for and in association with freight delivery, storage, and transport is even more staggering. A very great portion of the freight stolen or pilfered is taken directly from the vehicles, whether automotive or railway, and containers used in association therewith by unauthorized entry into the freight compartments thereof through the access doors therefor. Thus, it would be exceedingly advantageous to provide a practicable means for reducing, if not completely preventing unauthorized entrance through access doors into such vehicles and containers.

It is accordingly an object of the present invention to provide an improved anti-theft door-locking apparatus that is structurally simple, reliable in its function, convenient and easy to operate by authorized personnel but exceedingly difficult to manipulate successfully by unauthorized persons, and that is effective when actuated to constrain an access door in the closed position thereof.

Further objects and advantages, among others, of the present invention are in the provision of an improved anti-theft door locking apparatus of the character described that is versatile in its applicability to a great number of environments including automotive vehicles, railway cars, cargo containers, and the like; that in the environment of an automotive vehicle of the type used for storage and transport of freight can utilize the specialized equipment thereof to control the apparatus, thereby enabling personnel operating such vehicles to be able to conveniently manipulate the apparatus whereas unauthorized persons not having available the specialized equipment of such vehicles are not able to manipulate the apparatus; that can be used in association with the compressed air source provided by automotive freight vehicles such as semi-trailer rigs, delivery vans, etc., yet in the case of a tractor-trailer rig is able to accommodate disassociation of the tractor and trailer while maintaining the apparatus in either the door-locking or door-release conditions thereof; that has operation-inhibiting means to prevent inadvertent conditioning of the apparatus for its door-locking mode when the door associated therewith is open; and that can be used, if desired, in combination with other door-locking mechanisms which may or may not be conventionally included as a part of the vehicles and containers with which the apparatus may be associated.

Additional objects and advantages of the invention, especially as concerns particular features and characteristics thereof, will become apparent as the specification continues.

Embodiments of the invention are illustrated in the accompanying drawings, in which:

FIG. 1 is a side view in elevation of a tractor-trailer rig embodying the invention;

FIG. 2 is an enlarged rear end view in elevation of the trailer shown in FIG. 1;

FIG. 3 is a further enlarged broken vertical sectional view taken generally along the line 3—3 of FIG. 2;

FIG. 4 is a broken bottom plan view taken generally along the line 4—4 of FIG. 2;

FIG. 5 is a fragmentary view similar to that of FIG. 4 but illustrating the locking pin in the retracted position thereof and the operation-inhibiting means disposed in the path of travel of such pin;

FIG. 6 is a broken schematic view of the pneumatic energizing circuit for the apparatus shown in FIGS. 1 through 5;

FIG. 7 is a side view in elevation of a railway car having a modified embodiment of the invention incorporated therein;

FIG. 8 is an enlarged broken side view in elevation of a portion of the access door forming a part of the railway car shown in FIG. 7;

FIG. 9 is a further enlarged broken vertical sectional view taken along the line 9—9 of FIG. 8;

FIG. 10 is a broken transverse sectional view taken along the line 10—10 of FIG. 9;

FIG. 11 is a broken vertical sectional view taken along the line 11—11 of FIG. 9;

FIG. 12 is an enlarged fragmentary sectional view of a portion of the apparatus shown in FIG. 9; and FIG. 13 is a broken front view in elevation of the structure illustrated in FIG. 12.

Anti-theft door-locking apparatus embodying the present invention is useful in a great number of environments in which an access door is required to be maintained in the closed position thereof for the purpose of preventing unauthorized entry into a compartment closed by such door. Typifying environments for the invention include vehicles of many different types including automotive vehicles such as delivery vans and trailers, railway cars, cargo containers, and other similar environments. Two environmental uses for the invention are illustrated in the drawings, one being an automotive vehicle of the tractor-trailer rig type, and the other being a railway vehicle of the box-car type. It may also be observed that the invention is useful with access doors of substantially all conventional types including double doors, single doors, sliding doors, roll doors, plug doors, etc.

The embodiment of the invention illustrated in FIGS. 1 through 6 is shown in association with an otherwise conventional tractor-trailer rig denoted in its entirety with the numeral 15 and including the usual tractor 16 semitrailer 17. The tractor 16 is equipped with the usual air compressor (not shown) that supplies compressed air for braking and other purposes. Air supply conduits releasably interconnect the tractor 16 and trailer 17 adjacent the fifth-wheel mechanism, and one such supply conduit used with the present invention is illustrated in FIG. 1 and is denoted with the numeral 18. The conduit 18 supplies air under pressure to a manually operable three-way valve 19 from which air is carried to the rear of the trailer 17 via a conduit 20. The valve 19 may be completely conventional, and it is equipped with an exhaust port or conduit 21 (see FIG. 6). Adjacent the rear end of the trailer 17, the conduit 20 is connected with the anti-theft door-locking apparatus so as to supply compressed air thereto, the apparatus being denoted generally and schematically in FIG. 6 with the numeral 22 and details thereof will be explained comprehensively hereinafter.

The trailer 17 is provided within the interior thereof with a freight compartment access to which is afforded through an access doorway or opening 24 that is closed by a substantially conventional access door 25. As previously noted, the door 25 may take any usual form, and the door shown in FIG. 2 is a roll type equipped adjacent the bottom thereof with a manually maniputable handle 26. As respects the door 25 and handle 26 thereof, each may be completely conventional and, accordingly, details thereof will not be presented.

The door 25, therefore, can be rolled upwardly upon release of the handle 26 so as to uncover opening 24 and provide access to the freight compartment. A portion of the floor of such compartment is shown in FIG. 3 and denoted with the numeral 27, and such floor is bordered along the access opening 24 by a sill 28 defining the threshhold to the compartment. As shown in FIG. 3, the floor 27 may be formed of wood and the sill 28 formed of a metal such as steel, but the particular materials are not pertinent to and form no part of the present invention. A portion of the door 25 is shown in FIG. 3 by phantom lines.

The apparatus 22 includes support structure adapted to be fixedly secured to the trailer 17 adjacent the access door 25 thereof, as indicated generally in FIG. 2. In the form shown, the support structure includes a generally U-shaped component 29 one leg of which is turned laterally to provide a flange 30 welded or otherwise fixed secured to the vertically extending rear wall of a channel 31 constituting a part of the chassis of the trailer 17. The support structure further includes a bracket 32 similiarly welded or otherwise secured to the chassis channel 31, and the bracket is also secured to the outer end closure 34 of a cylinder 35 which has an end closure 36 adjacent the opposite terminus thereof. The cylinder composition 34, 35, 36, may be a completely conventional structure as, for example, a fluid-actuated piston-cylinder structure manufactured by Schrader of Brooklyn, New York. In the particular cylinder composition illustrated, the opposite ends of the cylindrical component 35 are inserted into openings provided therefor in the closures 34 and 36, and such end closures are compressively urged against the cylinder by a plurality of nut-equipped tie rods 37. Thus, the frame components 29 and 32 are united via the end closures 34 and 36, cylinder 35, and tie rods 37 because the end closure 36 is fixedly secured, as by welding, to the inner leg 38 of the component 29.

The apparatus 22 further includes a locking pin 39 carried by the support structure for movement between an active extended position shown in FIGS. 3 and 4 and an inactive retracted position, as shown in FIG. 5. In its active extended position, the locking pin 39 is adapted to cooperatively engage the access door 25 to constrain the same in the closed position thereof, and in its inactive retracted position, the pin releases the door for movement. The pin 39 is an axially extending component reciprocable between the active and inactive positions thereof.

In its active position, the pin 39 is adapted to project into an opening provided therefor by the access door 25, and in the apparatus being considered, the opening is shown in FIGS. 3 and 4 and is designated with the numeral 40. In more particular terms, the opening 40 is located adjacent the lower end of a latch plate 41 depending from the bottom of the access door 25 and provided as an integral component thereof or fixedly secured thereto by any suitable means such as a plurality of cap screws 42 extending through the latch plate and into cooperative engagement with a suitable component forming a part of the door 25. In any case, when the access door 25 is in its closed position, the latch plate 41 projects downwardly through openings 44 provided for this purpose in the sill 28 and into a position intermediate the spaced legs of the U-shaped frame component 29 to align the opening 40 with the axis of reciprocation of the pin 39 so as to enable the same to pass therethrough. For this purpose, the leg 38 of the support element 29 has an opening 45 therethrough, and the outer leg 46 of the component 29 has a recess or opening 47 aligned with the opening 45 and adapted to seat the end portion of the pin 39 therein, as shown in FIG. 4. Thus, when the pin 39 is in the locking position thereof, it is effectively reinforced by the closely spaced legs 38 and 46 of the support component 29, thereby reducing the length of the pin subjected to shear by any effort to elevate the access door 25.

The locking pin 39 is reciprocated between the extended and retracted positions thereof in response to plunger means carried by the support structure for movement between operative and inoperative positions respectively corresponding to the active and inactive positions of the locking pin to which it is connected. In the apparatus being considered, the plunger means constitute a piston 48 reciprocable within the aforementioned cylinder 35. The piston 48 may be formed integrally with the pin 39 or be a separate component secured to the pin by any convenient means. In any case, reciprocable displacements of the piston 48 occur in mechanically enforced synchronism with those of the pin 39.

Operating means are included in the apparatus for displacing the plunger or piston 48 into the operative position thereof illustrated in FIG. 4 in which the pin 39 is correspondingly located in the active extended position thereof. The operating means constitute a helical compression spring 49 seating at one end against the closure 34 and at its other end against the piston 48 to bias the latter continuously toward its operative position. It will be apparent that alternative arrangements may be provided for displacing the plunger into its operative position as, for example, use of a dual or two-way piston-cylinder composition in which fluid or air pressure is used to displace the piston 48 toward its operative position.

In any case, selectively operative energizing means are used in the apparatus 22 for displacing the plunger 48 into the inoperative position thereof in order to effect movement of the locking pin 39 into its inactive position and thereby release the access door 25 for movement into its open position. The energizing means employed include a source of pressurized air and delivery thereof to the cylinder 35 so as to displace the piston or plunger 48 into its inoperative position against the biasing force of the spring 49. Accordingly, the means include the aforementioned conduit 18 and source of compressed air provided by the tractor 16 and delivered to the conduit 20 via the valve 19. As shown in FIG. 4, the conduit 20 is connected to an inlet opening 50 communicating with the hollow interior of the cylinder 35 adjacent the end closure 36 thereof. It will be evident that when compressed air is delivered to the cylinder 35 through the conduit 20 and inlet port 50, the pressure-force developed between the facing surfaces of the end closure 39 and piston 48 will displace the latter toward the right (as viewed in FIG. 4) against the biasing force of the spring 49 to move the cylinder into its inoperative position and, therefore, to retract the locking pin 39 into its inactive position. The cylinder 35 may be provided with an exhaust port or passage 51, as through the end closure 34, to maintain atmospheric pressure within the cylinder 35 about the spring 49.

The apparatus 22 additionally incorporates therein operation-inhibiting means for holding the locking pin 39 in its inactive position to resist movement thereof into its active position when the access door 25 is open (i.e., the latch plate 41 is withdrawn from the space between the legs 38 and 46 of the support component 29, as shown in FIG. 5). The operation-inhibiting means are generally identified with the numeral 52, and includes an abutment component 54 carried by the support structure for movement between retracted and extended positions respectively shown in FIGS. 4 and 5. In the extended position thereof, the abutment component is located within the path of travel of the locking pin 39 and thereby prevents movement thereof from its retracted inactive position shown in FIG. 5 into the active position of FIG. 4. The abutment component 54 is reciprocal between the positions thereof shown in FIGS. 4 and 5, and it is generally guided for such movement by the spaced legs 38 and 46 of the support component 29 and by upper and lower guides 55 and 56 confined between such spaced legs, as shown in FIG. 3. The abutment component 54 is secured to a stem or shaft 57 projecting through an opening 58 therefor in the base wall 59 of the support component 29. Inward movement of the shaft 57 through the base wall 59 is limited by a stop 60 carried by the shaft, as is evident in FIG. 5, and the shaft and abutment component are biased inwardly by a helical compression spring 61 circumjacent the shaft 57 and seated between and against the facing surfaces of the base wall 59 and abutment component 54.

The abutment component has a cam surface 62 therealong, as shown most clearly in FIG. 3, adapted to cooperate with an inclined surface 64 provided by the latch plate 41 in generally spacing relation with the cam surface 62. Whenever the latch plate 41 is withdrawn from the space between the legs 38 and 46 of the support component 29 by opening of the access door 25, the spring 61 urges the abutment component 54 into a position in which it lies within the path of travel of the locking pin 39 so as to constrain the same in its retracted position, as shown in FIG. 5. However, upon downward displacement of the latch plate 41 into the position thereof shown in FIGS. 3 and 4 by closing the access door 25, the inclined surface 64 engages the cam surface 62 of the abutment component and displaces the same into the retracted position thereof illustrated in FIGS. 3 and 4, thereby permitting the locking pin 39 to return to its active extended position upon release of the pressure fluid from the supply line 20. It will be appreciated that the facing surfaces 62 and 64 may be provided advantageously with low friction surface coatings to facilitate displacement of the abutment component 54 and a lubricant such as heavy grease may be also be included to facilitate such movement.

Desirably, the entire apparatus 22 is protected against tampering so that it cannot be manipulated by unauthorized personnel. An example of such protection is shown in FIG. 3 which depicts the apparatus as being positioned within a generally closed chamber 65 defined in part by the sill 28, chassis channel 31, and by a closure plate 66 welded or otherwise fixedly secured to adjacent portions of the channel 31 and sill 28. The inaccessibility afforded by the closed compartment 65 is ordinarily of no significance because the apparatus 22 requires substantially no attention in maintaenance.

In use of the apparatus 22 in association with the tractor-trailer rig 15, whenever the door 25 is open to provide access to the interior of the trailer, the abutment component 54 is in the operation-inhibiting position shown in FIG. 5, thereby protecting against the possibility of the pin 39 being released and displaced into the active extended position thereof with the door open which would then prevent the door from being closed. However, any time that the door 25 is closed, the abutment component 54 will be displaced from its interposition in the path of movement of the pin 39 automatically upon down-ward movement of the latch plate 41 which causes the inclined surface 64 thereof to engage the cum surface 62 of the abutment component and displace it ot an ineffective position, as previously explained and as shown in FIGS. 3 and 4. Such displacement of the abutment-component occurs automatically upon movement of the plate 41 into the latch position thereof, and also automatic is the function of the pin 39 to project through the opening 40 in the latch plate 41 to lock the access door in its closed position provided that there is no active pressure-force bearing against the piston or plunger 48 to constrain the plunger and locking pin in their respective inoperative and inactive positions.

Assuming that the door 25 is closed and the trailer 17 is properly connected with the tractor 16, when the driver reaches his destination and is required to open the door, he simply pressurizes the conduit 18 (assuming that it is not already pressurized) by appropriate manipulation of controls, not shown, provided for this purpose within the cab of the tractor, and the three-way valve 19 is displaced through an angular distance of approximately 45° in a clockwise direction (as viewed in FIG. 6) to deliver the compressed air present in the conduit 18 to the conduit 20 and therefore to the cylinder 35 to energize the plunger 48. After the plunger is energized, the valve 19 can be returned to the closed position shown, whereby the pressure charge within the conduit 20 and end portion of the cylinder 35 remains trapped therein to maintain the pin 39 in its retraced inactive position. Accordingly, the tractor 16 may be separated from the trailer 17 with no affect on the system, should this be desired. The access door 25 may then be opened in the usual manner by manipulation of the handle 26 and by release of conventional lock mechanism should any be provided in association with the handle or door.

Once the door 25 is open, it is of no significance whether the conduit 20 and cylinder 35 remain energized or whether the compressed air charge is released therefrom because of the presence of the abutment component 54, as previously explained. In any event, whenever the door 25 is again closed, it can be locked in such closed position by the apparatus 22 simply by rotating the valve 19 an angular distance of approximately 45° in a counterclockwise direction (as viewed in FIG. 6) to connect the conduit 20 with the exhaust conduit 21, thereupon exhausting the pressure charge within the line 20 to atmosphere. As a consequence, the spring 49 again becomes effective to displace the plunger 48 and locking pin 39 into the extended active position of the latter whenever the latch plate 41 is in proper position therefor. The door cannot again be opened except by authorized personnel having an appropriate source of compressed air and the necessary coupling for connecting the same with the valve 19. This, of course, usually necessitates the presence of a tractor 16 in association with the trailer 17 and access to the driver's compartment of the tractor so that the engine thereof can be placed in operation and the proper controls manipulated to again pressurize the conduit 18. Further inhibition to tampering by unauthorized persons can be provided by associating the valve 19 with a lock or key-actuated control so that even if a source of compressed air is available at the valve 19 it cannot be connected to the conduit 20 in the absence of the proper tools for manipulating the valve.

A modified embodiment of the anti-theft door-locking apparatus is illustrated in FIGS. 7 through 13 in association with an otherwise standard railway car 75 having a slidable access door 76 by means of which an associated access opening can be selectively closed or uncovered. As respects the present invention, the car 75 and door 76 thereof are essentially conventional so that a detailed description of the features and characteristics of each is unnecessary. Accordingly, the limited illustrations of the door 76 presented in FIGS. 8 and 9 are adequate for present purposes, and by referring thereto it may be observed that the door 76 is rollingly supported for longitudinal displacements between open and closed positions upon a rail 77 through roller or wheel mechanism 78 secured to the door and extending downwardly therefrom for cooperative engagement with the rail. The rail is welded to a longitudinal frame component 79 forming a part of the chassis of the car 75, and frame components 80 and 81 are attached to the frame component 79 in superjacent relation therewith. A sill 82 is attached to the generally L-shaped frame member 80 and extends upwardly therefrom providing an offset area within which the door 76 seats. As previously noted, such structural assemblage of the car 75 and door 76 thereof is completely conventional and forms no part of the present invention.

The modified anti-theft door-locking apparatus is generally denoted with the numeral 84, and it includes somewhat U-shaped support structure 85 secured to the frame member 79 along the inner side thereof. The support structure 85 is provided with vertically spaced bearing elements 86 and 87 having vertically aligned openings therethrough that slidably receive a reciprocal locking pin 88 that extends upwardly through openings 89 and 90 respectively provided by the frame elements 80 and 81, and finally through an opening 91 in the sill 82 for receipt within a recess or opening 92 provided in the door 76. Therefore, the locking pin 88 is carried by the support structure for reciprocal movement with respect thereto between an active extended position shown in FIG. 9 in cooperative engagement with the door 76 to constrain the same in the closed position thereof, and an inactive retracted position shown in FIG. 11 releasing the door for movement.

As in the previous embodiment of the invention, the locking pin 88 is associated with plunger means carried by the support structure 85 for movement between operative and inoperative positions respectively corresponding to the active and inactive positions of the locking pin and effective to control the position thereof. Such plunger means includes a piston 94 reciprocable within a cylinder 95 fixedly secured to the upwardly extending leg 96 of the support structure. A plunger 97 is rigidly attached to the piston 94 and extends outwardly from the cylinder 95 closure wall 99 of the cylinder. Operating means in the form of a helical compression spring 100 circumjacent the rod 97 within the cylinder 95 so as to bear against the facing surfaces of the piston 94 and closure wall 99 biases the rod and plunger means toward the operative position thereof which corresponds to the active extended position of the locking pin 88. The cylinder 95 is reinforced in its connection with the leg 96 of the support structure 85 by a bracket 101 rigidly attached to each.

The plunger rod 97 is connected with the locking pin 88 through a lever system that includes a bell crank having legs 102 and 104 supported at their juncture for angular displacements about the axis defined by a pivot pin 105 extending through such juncture and through a post or bracket 106 welded or otherwise fixedly secured to the support structure 85. The crank leg 102 is connected with the plunger 97 by means of a slip connection in the form of a pin 107 extending through the plunger and into an elongated slot 108 in the crank leg 102. A bushing 109 reinforces the interconnection of the pin 107 and plunger rod 97 and tends to establish the positional relationship of the bell crank with respect to the rod. It will be evident that the elongated slot 108 in cooperation with the pin 107 accommodates angular displacements of the bell crank as the rod reciprocates along a linear axis.

The leg 104 of the bell crank is coupled to the locking pin 88 through a similar slip connection constituting an elongated slot 110 in the crank arm 104 and a pin 111 extending through the locking pin 88 and into the slot 110. The lower end portion of the locking pin 88 is enlarged, as shown at 112, for purposes of better accommodating the pin 111. The slot and pin connection 110, 111, accommodates concurrent angular displacements of the crank leg 104 and linear displacements of the locking pin 88.

The plunger means including the piston 94 and rod 97 are displaced from the operative positions thereof shown in FIGS. 9 and 10 toward the right (as seen in these FIGS.) into an inoperative position by selectively operative energizing means that takes the form of an enlargement 114 rigidly related to the rod 97 at the end portion thereof projecting through an opening 115 in the frame member 79. As shown in FIG. 9, the enlargement 114 may be secured to the rod by means of a threaded interconnection therebetween, and the two components may then be welded one to another to constrain the rod and enlargement against relative rotation. The enlargement 114 is adapted to be gripped by a suitable tool or implement (a cable, for example) and a tensile force applied thereto of sufficient magnitude to displace the rod and piston 94 against the biasing force of the spring 100. Such spring is selected so that the biasing force thereof is of large magnitude (several hundred pounds, for example) so that special equipment will be required to displace the plunger thereagainst into the inoperative position in which the locking pin 88 is retracted, thereby permitting the door 76 to open.

The apparatus also incorporates therein operationinhibiting means for holding the locking pin 88 in its inactive position to resist movement thereof into its active position when such associated access door 76 is open. In the apparatus 84, the operation-inhibiting means is manually operable and includes a recess 116 provided along the rod 97, and a detent 117 formed by the upper edge of the opening 115 in the frame component 79, as shown best in FIGS. 12 and 13. When the plunger means including the rod 97 are displaced into the inoperative position thereof in which the locking pin 88 is retracted into its inactive position, as shown in FIG. 11, the rod 97 may be displaced upwardly to seat the detent 117 in the recess 116, whereupon the rod is constrained against return movement. Accordingly, the locking pin 88 will be held in its inactive position until the rod 97 is released from the detent 117, as by inparting a sharp downward blow to the rod at the enlargement 114 thereof whereupon the spring 100 automatically returns the apparatus to the locking condition illustrated in FIG. 9. It will be apparent that the opening 98 in the end closure wall 99 of the cylinder 95, the fit of the piston 94 within the cylinder 95, and the loose or slip connection of the pin 107 within the slot 108 are all adequate to accommodate the slight angular upward displacement of the rod 97 necessary to interconnect the recess 116 thereof with the detent 117.

Operation of the apparatus 84 is generally apparent from the foregoing description, and in brief summary it may be observed that ordinarily the apparatus as the configuration shown in FIG. 9 in which the locking pin 88 thereof is in its active position in engagement with the door 76 to constrain the same against movement and thereby maintain it in its closed position. When it is desired to open the door 76, the plunger 97 is displaced into its inoperative position by application of a tensile force of sufficient magnitude to the enlargement 114, thereby displacing the locking pin 88 downwardly into its inactive position whereupon the door 76 can be opened. The apparatus 84 may be constrained in the latter condition thereof by tilting the rod 97 upwardly slightly to seat the detent 117 within the recess 116. Thereafter, the operative tensile force or pulling force can be released from the enlargement 114. Once the door has been returned to its closed position, the apparatus 84 is made operative by releasing the rod 97 from the detent 117 whereupon the spring 100 returns the rod to its operative position and the locking pin 88 into its active position of cooperation with the door 76.

As previously noted, the spring 100 is selected so that the force required to pull the rod 97 outwardly is of very substantial magnitude, thereby preventing one from releasing the apparatus 84 without having appropriate equipment available. For example, the biasing force of the spring 100 may be sufficient in magnitude that a forklift truck or other powerful vehicle is required to apply a tensile force of adequate magnitude to the enlargement 114 of the rod 97 through a cable or other attachment thereto. In correspondence therewith, a substantial force will be required to displace the recess 116 from the detent 117, thereby obviating inadvertent release of the plunger. Thus, unauthorized persons are effectively prevented from manipulating the apparatus 84.

While in the foregoing specification embodiments of the invention have been set forth in considerable detail for purposes of providing a complete disclosure of the invention, it will be apparent to those skilled in the art that numerous changes may be made in such details without departing from the spirit and principles of the invention.

What is claimed is:

1. Anti-theft door-locking apparatus for the access door to the freight compartment of an automotive van, railway car, on the like vehicle comprising: support structure adapted to be fixedly secured to such vehicle adjacent an access door to the freight compartment thereof, a locking pin carried by said support structure for reciprocal displacements between an active extended position in cooperative association with such door to constrain the same in the closed position thereof and an inactive retracted position releasing such door for movement; plunger means carried by said support structure for reciprocal movement between operative and inoperative positions respectively corresponding to the active and inactive positions of said locking pin and being connected therewith to control the position of said locking pin; operating means for displacing said plunger into the operative position thereof; selectively operative energizing means requiring greater than manual force for displacing said plunger into the inoperative position to effect movement of said locking pin into its inactive position and thereby releasing the door for movement; and operative inhibiting means for holding said locking pin in its inactive position when such door is open.

2. The apparatus of claim 1 in which said operation-inhibiting means includes an abutment component automatically movable into the path of travel of said locking pin upon retraction thereof into its inactive position and opening of an associated access door, said abutment component being displaceable from the path of travel of said locking pin upon movement of such associated access door into the closed position thereof.

3. The apparatus of claim 2 in which said abutment component is provided with a cam surface; and further comprising spring means biasing said abutment component toward a position in the path of travel of said locking pin; and a latch plate adapted to be carried by such access door for cooperative engagement with said locking pin to constrain the door in the closed position thereof, said latch plate being engageable with the cam surface of said abutment component to displace the same from the path of travel of said locking pin upon movement of the associated access door into the closed position thereof.

4. The apparatus of claim 3 in which said locking pin comprises a structural extension of said plunger means, and in which said operating means includes spring structure operative against said plunger means to bias the same toward the operative position thereof.

5. The apparatus of claim 4 in which said plunger means includes pneumatically actuated piston-cylinder structure, the aforesaid selectively operative energizing means being means for delivering compressed air to said piston-cylinder structure to displace the piston against the biasing force of said spring structure.

6. The apparatus of claim 1 in which said plunger means includes a bell crank defining the aforesaid connection of said plunger means with said locking pin, said operating means including spring structure biasing said plunger means toward the operative position thereof.

7. The apparatus of claim 1 in which said operational inhibiting means include detent and recess mechanism selectively operative upon movement of said locking pin into the inactive retracted position thereof to hold said locking pin in such inactive position; said recess provided along said plunger means, said detent provided at least in part by said support structure.

8. The apparatus of claim 7 in which said plunger means includes a bell crank defining the aforesaid connection of said plunger means with said locking pin, said operating means including spring structure biasing said plunger means toward the operative position thereof.

* * * * *